March 7, 1967 C. B. SMALL ETAL 3,307,760
METHOD OF CUTTING PIPES
Original Filed Nov. 22, 1963 2 Sheets-Sheet 1
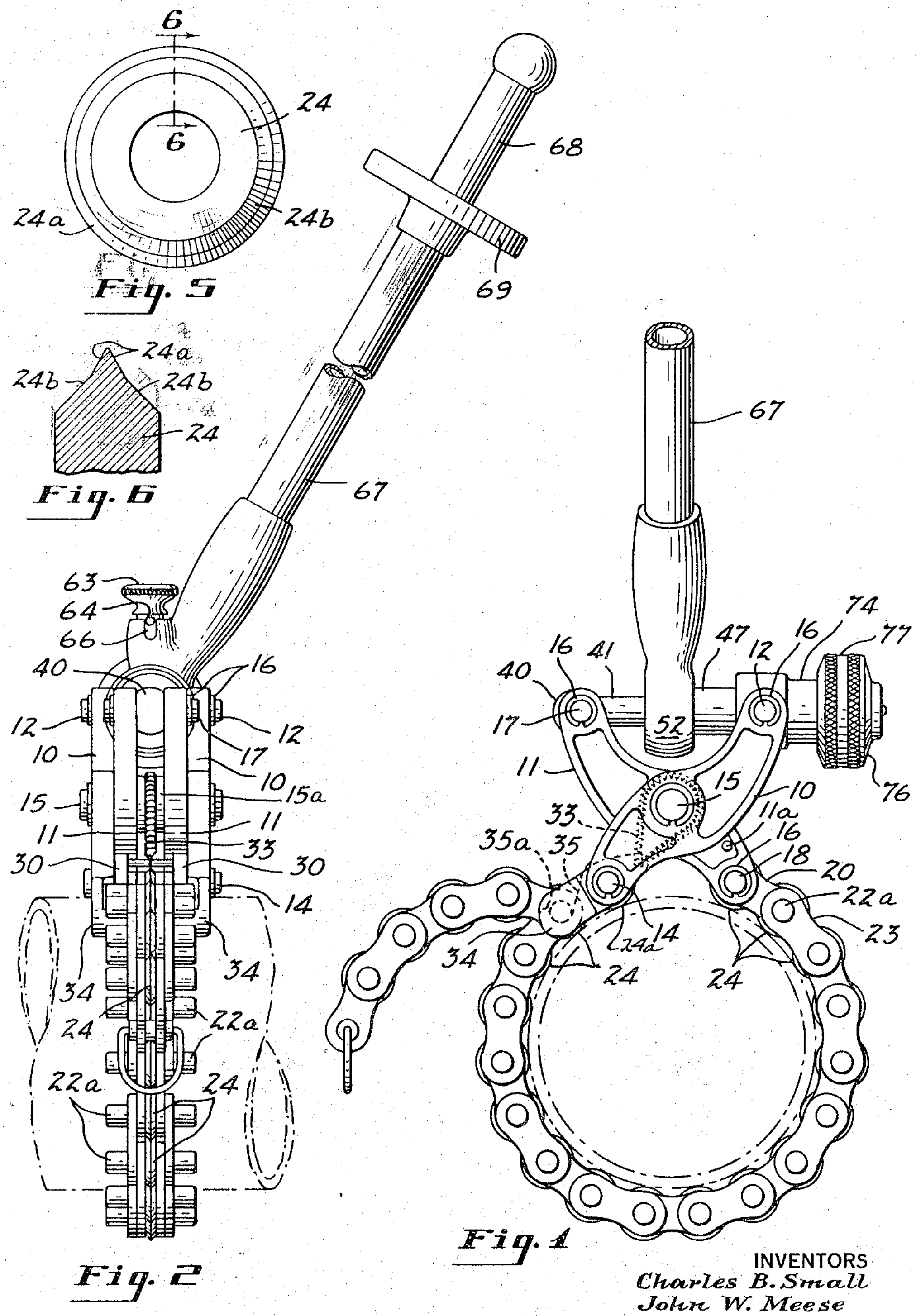
INVENTORS
Charles B. Small
John W. Meese
Heinrich H. Frank METHOD OF CUTTING PIPES
Original Filed Nov. 22, 1963
2 Sheets-Sheet 2
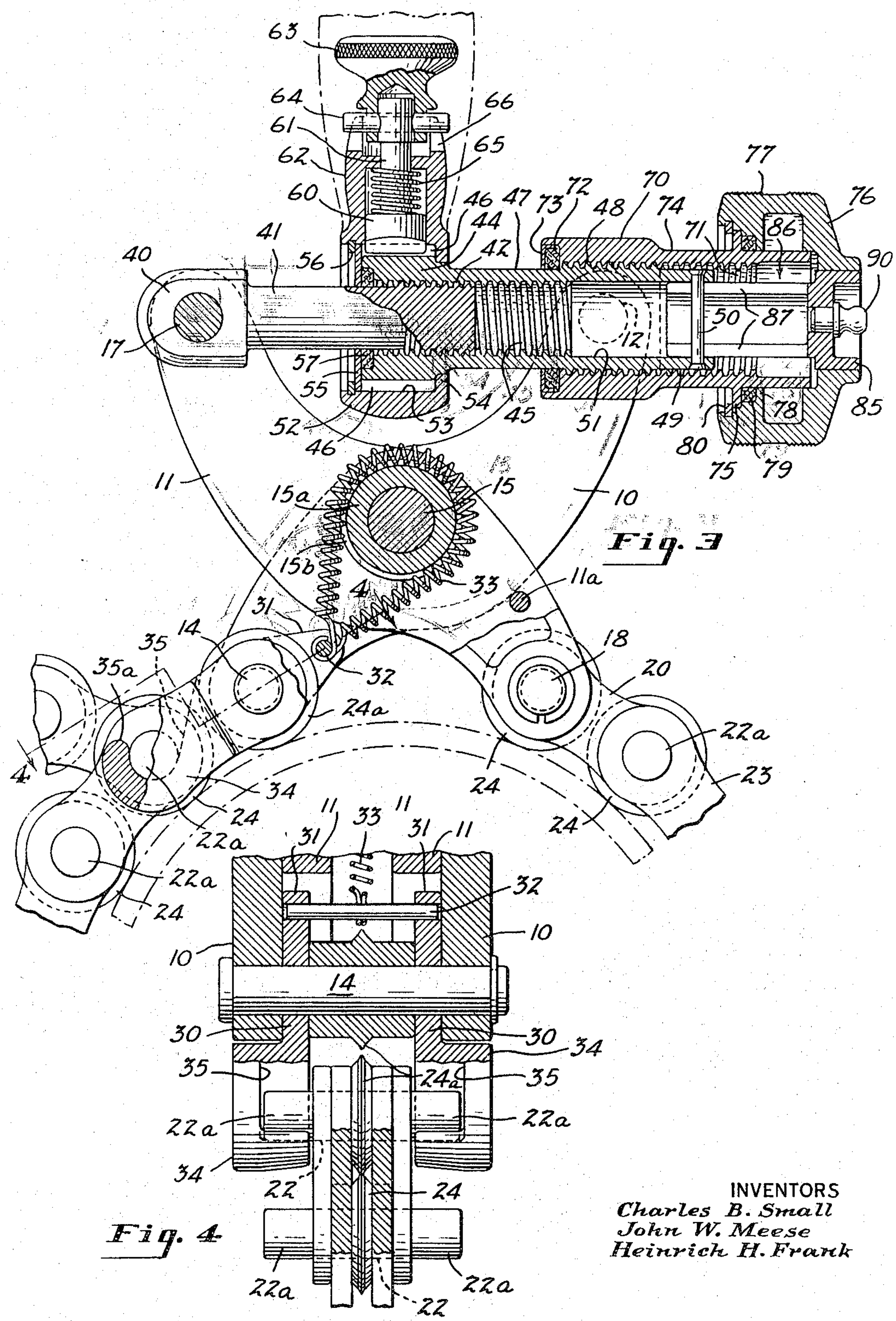
INVENTORS
Charles B. Small
John W. Meese
Heinrich H. Frank

United States Patent Office 3,307,760

Patented Mar. 7, 1967

3,307,760

METHOD OF CUTTING PIPES

Charles B. Small, Elyria, John W. Meese, Avon, and Heinrich H. Frank, Elyria, Ohio, assignors to The Ridge Tool Company, Elyria, Ohio, a corporation of Ohio Original application Nov. 22, 1963, Ser. No. 325,692, now Patent No. 3,221,962, dated Dec. 7, 1965. Divided and this application Nov. 9, 1965, Ser. No. 529,894

3 Claims. (Cl. 225—1)

This is a division of application Serial No. 325,692, filed November 22, 1963, now Patent No. 3,221,962.

This invention relates to improvements in pipe cutters and a method of cutting pipe. It is more particularly concerned with an improvement in the type of pipe cutter which employs a chain carrying a plurality of cutting blades and which is wrapped around the pipe and tension applied to the end for severing the pipe. It is of the general character as is shown by Patents 2,862,295, of December 2, 1958; 2,793,433, of May 28, 1957, and 1,510,256, of September 30, 1924. Cutters of this class are particularly useful in cutting the more brittle pipes such as cast iron soil pipe and clay pipe, and these are the principal types of pipes with which they are used.

Heretofore it has been proposed to cut pipe by the use of chain type cutters, of the above stated class, where tension was applied to the ends of the chain by a pair of handles similar to that used by bolt cutters, as shown in Patent 2,793,433. It was also contemplated that hydraulic means be used for applying tension to the ends of the chain such as shown in Patent 2,862,295. The use of screw operated means for applying the tension is shown in Patent 1,510,256. When the bolt cutter type of handles were used, the cutters were difficult to handle, particularly where the cutting was effected in a trench, because the sides of the trench interfered with the operation of the handles. Furthermore they were cumbersome and difficult to handle, being large and heavy. In addition, the operation required a great amount of strength on the part of the operator. The hydraulic means frequently required the use of a separate pump and connecting hoses which could leak and both of which required continuous maintenance. They also required sealing means for the hydraulic fluid, and the high pressure encountered required continued maintenance. These were also more costly to produce. They were also difficult to apply to the pipe being cut. Frequently it was difficult to find a place to mount the pump where it could be easy to operate. It was also extremely slow in operation. The screw operated cutter was also difficult to use particularly on the less brittle types of materials.

The present invention contemplates a cutter where a chain bearing cutter is connected between the ends of a pair of relatively short scissor connected levers, the other ends of which are moved by a screw means and a ratchet handle, to exert tension on the chain which is passed around the article to be cut. By this means a very simple mechanism is provided which is of small compass and light weight. The parts are so arranged that they cannot be contaminated and thus become inoperative. It can be quickly and easily applied to a pipe because the mechanism is not bulky. Because the mechanism is small and compact it is easily transported, and is particularly easy to apply to a pipe in places and in environments where the other types of cutters cannot be used. It is substantially free of maintenance problems. It can be operated with a minimum of effort because a large mechanical advantage is realized due to the cooperation of the levers, which provide a mechanical advantage in themselves, with a screw and ratchet means for operating the levers.

Of particular importance is the fact that only one operating handle is required and the movement of this handle is in a plane coincidental with the axis of the pipe, therefore there is nothing to hamper its operation since the movement of the handle during the cutting operation is along lines parallel to the longitudinal axis of the pipe and the sides of the trench do not interfere with its movement. The pipe also acts as a base or second lever for absorbing the effort applied to the device through the handle; therefore the handle can be operated by two hands if desired. Due to the mechanical advantage gained, however, less effort is required and greater force can be applied and only one hand is needed to operate the same.

Another advantage of the above construction is realized from the manner of its operation. In the prior devices the chain was merely tightened around the pipe and the cutter blades forced substantially radially inward of the pipe until they penetrated the pipe far enough to cause the pipe to break. Such movement of the cutter wheels as there was, other than radially, was circumferentially of the pipe, and this movement was minimal. In the present invention, the movement of the ratchet handle longitudinally of the pipe causes a rocking of the cutter blades at the end of the scissor levers and some rocking of the cutters on the adjacent links. The rocking is longitudinally of the pipe and diminishes in the cutters progressively around the pipe away from the lever ends. The above rocking starts as soon as the worker starts to use the ratchet and is due to the alternate to and fro movement of the ratchet handle. This movement increases as the chain tightens and more effort is required to move the ratchet handle.

The result of the foregoing is that the contact of the blade with the pipe has another increment of force added to the radial force and this force is not present in any of the prior art. That is, as the blades are pressed in, they also partake of a pivotal transverse movement, which causes better penetration with less effort. In addition, as the blades penetrate deeper into the pipe, there is a leverage applied by the rocking movement of the cutter on the sides of the indentations on the pipe which causes the pipe parts to be forced apart in a longitudinal direction. Thus the pipe is separated quicker and there is less chance that the pipe will be crushed, as in the prior art which partakes largely of a radial inward movement with a resultant irregular breakage around its periphery, which is undesirable. In addition to the above, the longitudinal forces causing separation are also assisted by the particular formation of the cutter blades.

Still other advantages of the invention, and the invention itself, will become more apparent from the following description of an embodiment thereof, which description is illustrated by the accompanying drawings and forms a part of this specification.

In the drawings:

FIG. 1 is a side elevational view of a pipe cutting tool, part of the end of the handle being broken away, and illustrating its manner of engagement with a pipe;

FIG. 2 is a similar view at 90° to FIG. 1, with the intermediate portion of the handle broken away;

FIG. 3 is an enlarged fragmentary sectional view of the chain tightening means, part of the ratchet operating means and fragments of the chain;

FIG. 4 is a section on the line 4—4 of FIG. 3;

FIG. 5 is an enlarged side elevation of a cutter blade; and

FIG. 6 is a section taken on the line 6—6 of FIG. 5.

Briefly, the invention contemplates a pair of levers pivotally connected together in scissor fashion intermediate their ends. At the ends the levers are connected to a link chain, the pivots of which have cutter wheels mounted thereon. The other end of the levers are engaged with a screw mechanism, which may be operated by a ratchet, to pull the ends of the levers together and cause the other ends to exert tension on the ends of the chain, which surrounds the pipe, to cause the pipe to be severed. During the "ratcheting" of the screw mechanism, the levers, together with the cutter blades, partake of a tilting or rocking movement on the pipe. The pivot for the levers is such that the parts beyond the pivot, where the force is applied, are longer than the parts which are connected to the chain, thus realizing a mechanical advantage.

More specifically, the device includes two pairs of levers 10 and 11, which are generally of S shape. The pair of levers 10 have their upper ends secured together in spaced relation by cylindrical bosses 12, which extend from each side of a trunnion. At their lower opposite ends they are secured by a hook link pin 14. Spaced from the lower ends they are connected by a hinge pin 15. The pins extend beyond the sides of the levers and are locked in position by C rings 16, which are disposed in grooves in the pins.

The other levers 11 are secured together in a like manner but less widely spaced since they are journalled on the pivot pin 15 between the levers 10. The upper ends are engaged with an eye pivot pin 17 and the lower ends with a chain link pin 18. They are likewise secured in place by C rings 16. Because of this arrangement each of the pairs of levers 10 and 11 move as a unit.

The cutter chain is of the link type and has cutter members carried by each of the pins which connect the links together. Referring to FIGS. 1 and 3, the first link of the chain is comprised of a pair of spaced side links 20, the ends of which are journalled on the link pin 18 at the lower end of the lever 11, and the other ends being journalled on a link pin 22 between the more widely spaced side links 23 of the next succeeding link. Also journalled on the pins 18 and 22, between the links 20, are the cutter members, which in this instance take the form of cutter wheels 24. This arrangement continues throughout the length of the chain, each link pin having a corresponding cutter wheel.

As can best be seen from FIGS. 2 and 4, the link pins 22 project outwardly beyond the sides of the links to provide projections **22*a*, whereby the chain may be removably secured at any of the link pins 22 to a hook coupling on the end of the other lever 10, while the end previously described remains attached to the lever 11** at all times.

The purpose of enabling the chain to be attached at any point throughout its length to the levers 10, is to enable the cutter to be used with different diameters of pipe. To this end, the ends of the levers 10 are provided with hook means which enables the pins 22 to be hooked therein.

As best shown in FIGS. 3 and 4, the levers 10 are apertured near their ends and the pin 14 extends through these apertures, bridging the space between the levers. The pin has a cutter wheel **24*a* rotatably journalled on the central part, which in this instance is provided with hub portions extending laterally from each side. This prevents the pin 14 from bending under load. It is flanked on each side by hook side links, that are right and left hand links, each being a mirror image of the other. They each comprise a pin engaging part 30, of a thickness to close the space between the cutter wheel hub and the levers 10 and rotatable on the pin 14. The inner ends of the side links toward the lever 10 are each provided with an extension 31. Near the end of these extensions a pin 32 is secured which bridges the space between the links. The lever hinge pin 15 is provided with a sleeve 15*a*, which bridges the space between the levers 11. This sleeve has a central circumferential groove 15*b*, and a helical spring 33 has its ends connected to the pin 32 with the body of the spring stretched to provide tension thereon, and seated in the groove 15*b* surrounding the sleeve 15*a* and pin 15. The lever hinge pin 15 and sleeve 15*a* may also be one solid member which would increase its rigidity and prevent shearing under load since the part 15*a* could extend into the levers 11. Since the hook link is free to rotate on the pin 14, the force of the spring from the pivot point for the levers to the pin 32 always causes the links, in their free position, to project from the ends of the levers on a line coincident with the axes of the pins 15, 32 and 14. This, as will later be seen, holds the link in a position where it is always readily engaged with the chain projections 22*a***, and this facilitating assembly with the pipe to be cut.

The bodies 30 of the hook links extend beyond the ends of the levers 10, and then extends laterally outward at 34 to provide a thickened portion. The inner walls of the thickened portion, the innermost surface of which is coincident with the inner surface of the body 10, are formed with recesses to provide hook shaped seats 35, which open vertically upward and thus provide hooked ends **35*a*. The outwardly extending ends 22*a* of one of the pins 22** may engage in these hook shaped sockets, as best seen from FIGS. 3 and 4. It will thus be seen that the hook seats are reinforced by the outer walls and can be subjected to extreme tension without distortion.

The screw means for controlling the movement of the levers includes an eye 40 of an eye screw secured by the eye pin 17 between the levers 11 and which has a shank 41 provided with left-hand threads 42. The threads may be of the Acme type and be either single, or multiple lead threads. In this instance, double lead threads are preferred. The shank 41 of the eye screw extends through the head 44 of a ratchet sleeve and is in threaded engagement with internal matching threads 45 thereof. The head of the ratchet sleeve is provided with ratchet teeth 46. Adjacent the head the ratchet sleeve is provided with a stem portion 47 of reduced diameter, followed by an enlarged and elongated part 48 having right-hand external threads which extend outwardly of the part 47. These threads may also be of the Acme type and single or multiple threads; dual lead threads are preferred. The extreme end of the ratchet sleeve is provided with a smooth reduced portion 49, which may be substantially the same size as the part 47, or of a diameter equal to the root diameter of the threads 48 and has a cross pin 50 extending across the diameter and held in position by heading or staking the ends. The threads 45 extend to a point substantially opposite the beginning of the threads 48 and is then followed by a smooth bore 51 which has an inner diameter substantially the same as the root diameter of the threads 45.

The head 44 of the ratchet sleeve has a ratchet body 52 disposed thereon. The ratchet may be of conventional construction and includes an enlarged bore 53, which surrounds the teeth 46 on the head 44, and an inwardly extending flange 54 which rides on a shoulder on the ratchet sleeve head adjacent the sleeve which prevents it from coming off the head. Further longitudinal movement of the ratchet body 52, relative to the teeth, is prevented by a washer 55 seated in the bore at the outer ends of the teeth 46 and held in place by a spring retaining ring 56 seated in a groove in the ratchet body. The ratchet head is counterbored at the outer end and a grease seal 57 is seated in the counterbore and held in place by the washer 55. The seal engages with the shank 41 of the screw eye and prevents escape of lubricant through the end thereof.

The ratchet body has the usual ratchet pawl 60, having a stem 61 which extends outwardly through a boss 62. A knob 63 is provided on the end of the stem, being held thereon by a cross pin 64. A coil spring 65 is provided with one end seated in the end of a bore in the boss and the other end engaging the pawl body 60 to cause the pawl to be spring-pressed inwardly. The end of the boss is provided with notches 66 into which the pin 64 may pass when the pawl is rotated to bring the pin 64 into alignment with the notches. At this time the end of the pawl 60 engages with the teeth 46, and being wedge-shaped may be used to turn the ratchet sleeve with the usual ratcheting action in either direction, depending upon the position to which the knob 63 is turned before allowing the pin 64 to pass into the notches.

Obviously swinging of the ratchet handle 67 causes the ratchet sleeve to be turned.

As previously stated, the pair of levers 10 have their upper ends journalled on a pair of trunnion pins 12. The trunnion member comprises a body 70 having an internally threaded bore 71, which is in threaded engagement with the right-hand threads 48 of the ratchet sleeve. The left-hand end of the body is provided with a counterbore in which a grease seal 72 is disposed and held in place by a cup retainer ring 73. The grease seal engages with the outer surface 47 of the ratchet sleeve and the retainer ring extends toward the surface of the shaft slightly below the crests of the threads 48.

The body 70 has a reduced diameter portion 74 which is provided with a peripheral flange 75, spaced from the end.

A knob or hand wheel is provided by which the ratchet sleeve may be rotated independently of the ratchet to provide a quick adjustment of the device. The knob includes a head 76, having a skirt 77 which extends to the left, over the stem 74 and flange 75 of the ratchet sleeve. The skirt is provided with an inwardly extending portion which is formed to provide a flange 78, which rides on the portion 74. Adjacent the flange, the skirt has a counterbore for the reception of a grease seal 79, which engages with the flange 75 and the surface 74 on the ratchet member. The knob is held on the ratchet member by a retainer ring 80, seated in a groove in the skirt and extending opposite to the flange 75.

The head 76 of the knob is provided with a ratchet sleeve operating member which includes a body 85 pressed into an opening in the head and having a slotted stem 86 coaxial with the skirt extending into the smooth bore 51 of the ratchet member. The slots 87 are sufficiently wide to enable the pin 50 on ratchet member to pass therein and engage with the walls of the slot. The skirt 77 of the knob is knurled and, when the knob is rotated by hand, the stem 86 engages with the pin 50 and rotates the ratchet sleeve.

A lubricant fitting 90 is provided for supplying lubricant through the head 85 to the interior of the device.

It will be apparent that when the ratchet sleeve is rotated, either by the knob 76 or the ratchet, that the engagement of the threads 45 on the sleeve with the threads 42 on the eye screw, will cause the screw to be moved to the right or left, depending on the direction of rotation of the sleeve. At the same time the engagement of the threads 48 on the outside of the ratchet sleeve with internal threads 71 of the trunnion member will cause that member to be moved to the left or right. Since the eye screw is connected to the lever 11, and the trunnion member to the lever 10, the above movement will cause the ends of the levers to be moved together or apart.

In operation, the knob 76 is first turned to cause the upper ends of the levers to be moved apart. This is the position shown in FIGS. 1 and 3. A pin **11*a* carried by the lever 11, projects outwardly on opposite sides, and when the levers are moved, the pin engages with the edges of the lever 10 and limits the opening thereof, thus preventing the screw mechanism parts from becoming disengaged with each other. The chain is then passed by hand around the pipe to be cut, pulled as tightly as possible and the ends of one of the link pins, closest to the hook link, placed into the hook seats. This is facilitated by the fact that the spring 33 engaged with the pin 32** holds the hook members in a position outward of that shown in FIG. 3.

Then the hand knob 76 is rotated in the other direction to bring the upper ends of the levers 10 and 11 toward each other, to quickly tighten the chain around the pipe. This preliminary tightening can be effected quickly and relatively easy, since the chain can be held in position by one hand and the knob rotated with the other hand.

After the slack is taken out of the chain, the knob 63 on the ratchet is turned to the proper position so that the pin 64 drops into the notches 66 and the pawl engages with the teeth on the ratchet sleeve. The ratchet sleeve is then rotated by the handle to cause the upper ends of the levers 10 and 11 to be pulled together, increasing the tension on the chain around the pipe.

The cutter members, which are illustrated as cutter wheels, have a novel formation; the extreme edges **24*a* of the wheels are provided by sides that have a total included angle of 60° and this is backed up by a portion 24*b* having sides that have an included angle of 90°, as best shown in FIG. 6. The height of the outer portion may be substantially the same as the inner portion, although preferably it is less. As an example, for a cutter wheel having a diameter of 1.225 inches, the part 24*a* could be 1/16″, and base part 24*b*** 3/32″. It is also pointed out that the extreme edge is preferably not a sharp edge but one with a radius, which could be .007 to .009 inch.

As the ratchet is rotated and the chain tightened, the sharper angled part of the wheel readily penetrates the outer glass-like surface of the pipe. It will be appreciated that the effort to move the handle is opposed by the pipe itself which cannot readily tilt lengthwise, particularly when it is on the ground, in the bottom of a trench, or is a part of a string of pipes. It will also be appreciated that the effort to move the handle increases as the chain is pulled tighter. Since the pull is on the outer end 68 of the handle, the torque applied to the ratchet sleeve causes a tilting of the levers 10–11, relative to the longitudinal center line of the pipe with the cutter blades 24 and **24*a***, which are in the pipe engaging ends of the levers, acting as a fulcrum. Thus, each time the ratchet handle is operated to increase the tension on the chain, there is an inward radial movement of the cutter wheels, along with a slight circumferential movement and a rocking movement of the blades at the ends of the levers. As the blades gradually penetrate the work, the rocking movement becomes more effective and there is now a slight kerf which has been formed by the cutter blade and as it is rocked the side edge of the kerf becomes the fulcrum point and the extremity of the blades on the end of the levers is pushing alternately with the rocking movement against the other side of the kerf, tending to push the two parts of the pipe apart.

As the tension is further increased, the sharper edge eventually penertates to its full depth, if the pipe does not break first, then the wider portion of the blade enters the kerf and provides a wedging action which, along with the tilting action, is effective to eventually separate the pipe.

The tilting action also assists the cutter to penetrate the pipe and this is in addition to the radial action with a result that the pipe is separated much sooner and with less pressure than where a radial pressure alone is used. Since less pressure is required, there is less opportunity for the pipe to be crushed and the edges are cleaner and less jagged than with the other cutters.

Another advantage realized is that the pressure can be applied as gradually as desired and in time the operator is able to recognize the amount of pressure required to break the pipe and thus is not caught by surprise when the pipe does break. In some instances he may operate the handle to apply a certain amount of pressure and then rock the handle back and forth without actually increasing the pressure. This provides another action in that the parts of the chain which are not being rocked have the radial tension increased and decreased synchronously with the rocking action and the lever action by the cutters at the ends of the levers 10–11. This causes the pipe to disintegrate in the kerf and assists in a clean break.

When the pipe finally does break, the piece being broken off, if it happens to be short, is not ejected violently away from the large piece and thus does not fly away and strike other workmen.

The end of the handle 67 is provided with a grip 68. Spaced from the end is a flange 69 which prevents the hand from hitting the pipe. This is particularly useful when the final break occurs and the chain passes through the pipe suddenly, relieving tension on the ratchet mechanism.

It will be seen that by this arrangement the compass of the tool is very small, thus it can be made relatively light in weight and this greatly facilitates handling, both on the ground and in the trench. It is particularly useful where it is desired to cut into a line which may be above the ground, such as a vertically extending soil pipe. The hand operated knob, for preliminary tightening of the chain, facilitates assembling the cutter with the pipe since the chain may be passed around the pipe and hooked in the hook 35 and held in position with one hand and the knob rotated with the other hand. This also enables the device to be easily attached to the pipe at the exact spot where the cut or break is to be made. After the pipe is broken, the levers may also be quickly moved to their original position.

Of particular importance is the fact that there are no handles which have interference with the sides of a trench and the device can be operated in places where a pair of handles could not be operated at all. Furthermore it should be realized that the outside diameter of the pipes may vary, due to irregularities or manufacturing tolerances, and there are no handles which, at the start, are either so far apart that they cannot be operated, or so close together that they cannot be moved far enough without contacting with each other, to break the pipe.

A peculiarity of the present construction resides in the fact that the ratchet handle is always opposite the pivot 15 for the levers and midway between the upper ends of the levers. Thus when the ratchet is operated, the forces are applied to the ends of the levers in a balanced manner and there is no tendency for one side of the assembly to be tilted more than the other. This feature is particularly valuable in connection with the application of the intermittent longitudinal forces by the cutter blade to the pipe, which assists in parting the pipe.

It has been found that the ratcheting action is such as to provide increased tension to the chain in an intermittent manner. That each time the ratchet is operated to increase the tension, the pressure of the cutters on the pipe increases as the ratchet is being moved. Then, when the ratchet is moved backward, during the interval of the backward movement, the pressure of the wheels on the pipe decreases somewhat due to their continued penetration of the pipe.

The device constructed as shown is substantially impervious to water, ice or mud and therefore cannot become clogged. Foreign material cannot get into the inside and cause wearing of the parts.

Having thus described our invention in the embodiment thereof, we are aware that numerous and extensive departures may be made therefrom without departing from the spirit or scope of the invention as defined by the appended claims.

We claim:

1. The method of cutting pipe which comprises applying concentrated radial pressure around said pipe with a plurality of circumferentially spaced cutter means, and concomittantly applying force to urge rocking movement to at least one of said cutter means.

2. The method of claim 1, wherein the radial pressure and rocking pressure are progressively increased.

3. The method of claim 2, wherein the pressure increases are applied intermittently.

References Cited by the Examiner

UNITED STATES PATENTS

| | | | |
|---|---|---|---|
| 2,282,692 | 5/1942 | Athon et al. | |
| 2,949,669 | 8/1960 | Wheeler | 225—103 |
| 2,950,035 | 8/1960 | Wheeler | 225—1 |

WILLIAM W. DYER, Jr., *Primary Examiner.*

J. M. MEISTER, *Examiner.*